United States Patent [19]
Kato et al.

[11] Patent Number: 5,179,492
[45] Date of Patent: Jan. 12, 1993

[54] PROTECTION CIRCUIT FOR DETACHABLE OPERATING UNIT USED IN AUDIO DEVICE

[75] Inventors: Seiji Kato; Kazuhiro Kiyoura, both of Saitama, Japan

[73] Assignee: Pioneer Electronic Corporation, Tokyo, Japan

[21] Appl. No.: 857,719

[22] Filed: Mar. 25, 1992

Related U.S. Application Data

[63] Continuation of Ser. No. 605,715, Oct. 30, 1990, abandoned.

[30] Foreign Application Priority Data

Mar. 30, 1990 [JP] Japan ............................. 2-81008

[51] Int. Cl.$^5$ ............................................. H02H 3/24
[52] U.S. Cl. ................................. 361/58; 361/82; 361/84; 307/127
[58] Field of Search .................. 361/84, 82, 58; 307/127

[56] References Cited

U.S. PATENT DOCUMENTS

| | | | |
|---|---|---|---|
| 3,614,531 | 10/1971 | Oswald | 361/56 |
| 3,940,785 | 2/1976 | Genesi | 357/48 |
| 4,037,265 | 7/1977 | Smith | 361/58 |
| 4,492,878 | 1/1985 | Hamel | 307/127 |
| 4,843,515 | 6/1989 | Richman | 361/58 |
| 4,945,444 | 7/1990 | Schwertlein et al. | 361/101 |
| 4,958,251 | 9/1990 | Cini et al. | 361/84 |
| 4,979,071 | 12/1990 | Ito et al. | 361/56 |
| 5,012,381 | 4/1991 | Elliot et al. | 361/84 |

FOREIGN PATENT DOCUMENTS 0253947 1/1988 European Pat. Off. .

OTHER PUBLICATIONS

EDN Electrical Design News. vol. 29, No. 2, Jan. 1984, Boston, Mass., pp. 137–152; Paul Mannone: "Careful design methods prevent CMOS latch-up".

Primary Examiner—Steven L. Stephan
Assistant Examiner—Ben M. Davidson
Attorney, Agent, or Firm—Sughrue, Mion, Zinn, Macpeak & Seas

[57] ABSTRACT

A detachable operating unit for connection with a main unit comprises at least two power supply units for applying operating voltages to the detachable operating unit, the power supply units generating two different voltages, respectively; at least two power supply terminals for engaging the detachable operating unit and the main unit to receive two different voltages applied to the power supply units, respectively; a ground terminal for engaging the detachable operating unit and the main unit; a protective circuit for applying a reverse voltage in repsonse to a differential voltage between voltages of the power supply units, the protective circuit being disposed between one of power supply units which generates the operating voltage lower than that of the other power supply unit, and the ground terminal.

2 Claims, 2 Drawing Sheets

PROTECTION CIRCUIT FOR DETACHABLE OPERATING UNIT USED IN AUDIO DEVICE

This is a continuation of application Ser. No. 07/605,715 filed Oct. 30, 1990 abandoned.

BACKGROUND OF THE INVENTION

The present invention relates to a protection circuit for a detachable operating unit used in an audio device. More specifically, it relates to a protection circuit for a detachable terminal such that when the detachable operating unit is connected to a main audio device, the main audio device applies two different voltages to the detachable operating unit by two power supplies through two contact points, respectively.

In an automotive audio device for an automobile such as a car stereo, a car compact disk player and a car radio, a detachable operating unit 3 having an input key unit 1 and a liquid crystal display unit 2 is detachable from a main audio device 4 as shown in FIG. 2. When the car is stopped or parked, the detachable operating unit 3 may be separated from the main audio device 4 to prevent the audio device from being stolen.

The detachable operating unit 3 comprises an IC circuit 5 controlling the input key unit 1, the liquid crystal display panel unit 3, and an illumination lamp 6 for illuminating a surface of the liquid crystal display unit 2.

An operating voltage VDD of the IC circuit is, for example, +5 V at a relatively low level. On the other hand, an operating voltage ILL of the illumination lamp 6 is, for example, +14 V at a relatively high level. Therefore, both operating voltages could not be supplied from a single power supply unit. As a result, the operating voltages are supplied by two power supply units through power supply terminals 7a and 7c, respectively. A contact terminal 7b is used for the ground (GND).

However, in the case where the detachable operating unit 3 having such a structure for the operating voltages VDD and ILL separately applied to the detachable operating unit 3 is engaged with or disengaged from the main audio device, if the timing of connection of the ground terminal GND to the main audio device is delayed from that of the power supply terminals 7a and 7c, a reverse voltage in response to a differential voltage between the operating voltages ILL and VDD (for example, 5 V−14 V= −9 V) is inadvertently applied to the IC circuit 5 thereby damaging the IC circuit.

Therefore, to overcome the above-described problems inherent in the conventional apparatus having the operating detachable portion, a detection switch 8 has been included on the engaging surface of the main audio device. This detecting switch 8 detects whether the operating detachable unit 3 is engaged or disengaged. As a result, once the switch 8 determines that a operating detachable unit has been engaged with the main audio device without a failure, the operating voltages VDD and ILL are thereafter supplied to the power supply terminals 7a and 7c, respectively. However, to prevent the IC circuit from being broken by controlling the supply timing of the operating voltages to the power supply terminals, the audio device is required to include a detecting switch, an ON/OFF switching unit of the power supply, a control circuit for controlling the ON/OFF switching unit of the power supply, and software for controlling the ON/OFF switching unit and control circuit, so as to increase the number of mechanical and electronic parts and additional processing. The mounting space of audio device is also increased, resulting in an undesired enlargement of the device.

SUMMARY OF THE INVENTION

In view of the above problems inherent in the prior art, it is an object of the present invention to provide a simple protection circuit for a detachable unit in which when the detachable unit is engaged with or disengaged from a main device, if contact timing of a ground terminal to a main device is delayed from that of the power supply terminals thereof, an internal circuit such as an IC circuit may be protected from an accidental reverse voltage.

To accomplish the above and other objects, according to the protection circuit for detachable operating unit of the present invention in which the detachable operating unit could be engaged with or disengaged from the main device, when the detachable unit is engaged with the main device, the different operating voltages are supplied to the main device through terminals, respectively, the detachable unit is characterized by comprising a protecting diode connected between the power input terminal of one of operating power supply units which has a voltage lower than that of the other operating power supply unit and a ground terminal with reverse polarity.

According to the present invention, when the timing of connecting the ground terminal to the main device is delayed from that of the power supply terminals, the reverse voltage in response to the voltage difference between the two operating power supply unit is applied to the protective diode. As a result, the reverse voltage generated between the lower operation power supply unit and the ground terminal is regarded as the voltage drop caused by the voltage through the protective diode in the forward direction so as to prevent internal circuit such as the IC circuit connected to the operating power supply generating voltage lower than that of the other operating power supply unit from being broken by the reverse voltage.

DETAILED DESCRIPTION OF THE PREFERRED EMBODIMENTS

The present invention will now be described in more detail with reference to the accompanying drawings.

One example of a detachable unit according to the present invention will now be described.

In a detachable operating unit 3, a protective diode 9 is connected between a power supply terminal 7a and a ground terminal 7b with a reverse polarity.

Figure 1:
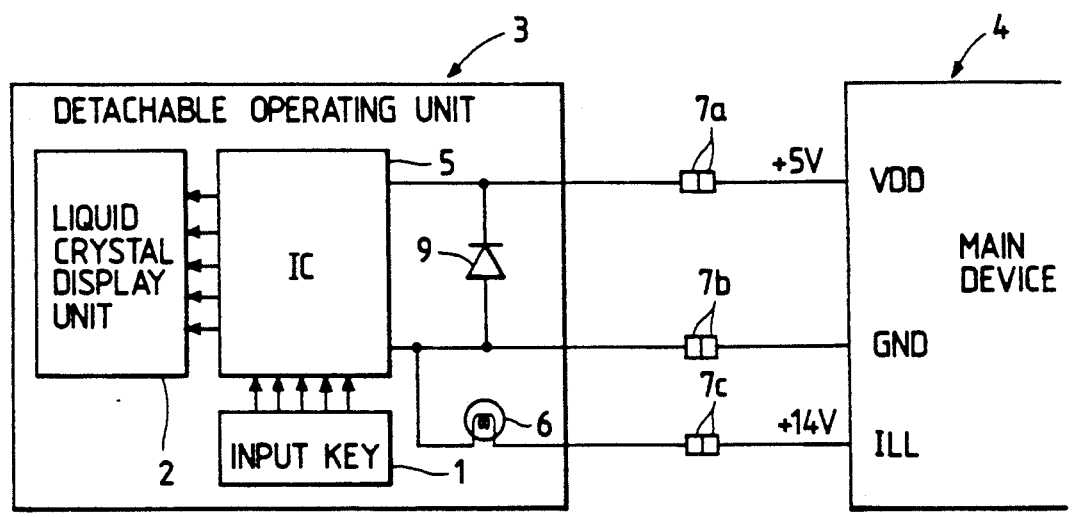
FIG. 1 is a block diagram showing the structure of the present invention.
Figure 2:
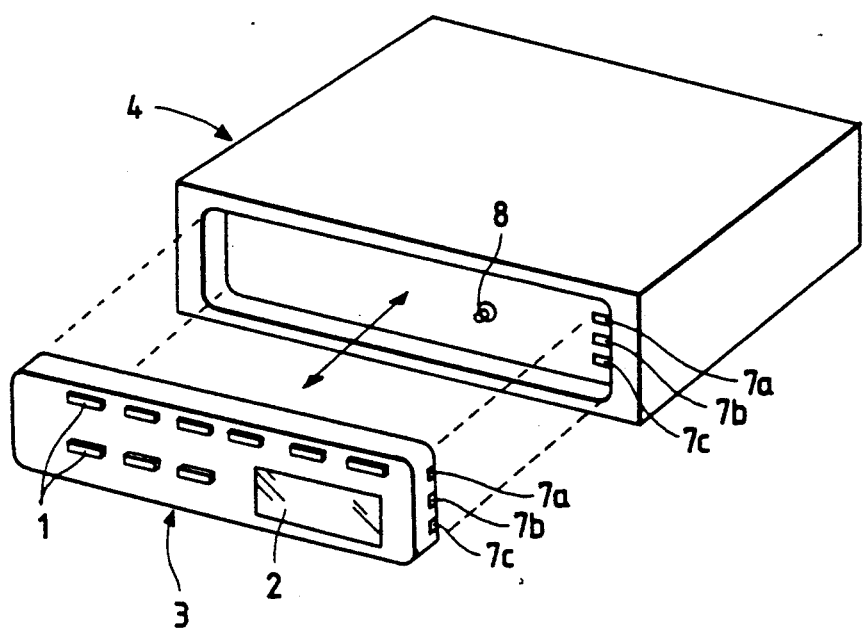
FIG. 2 is a schematic illustration of the conventional apparatus having the detachable unit.
Figure 3:
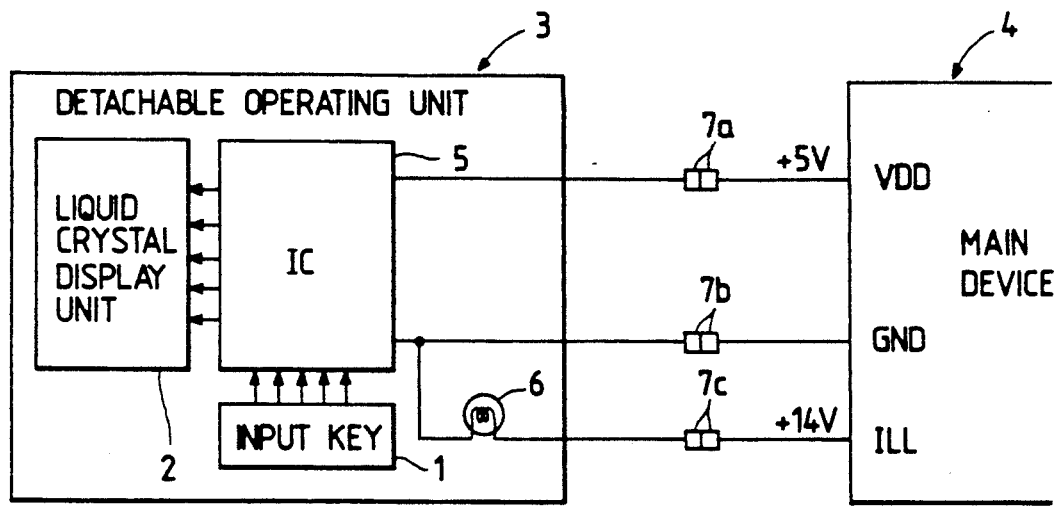
FIG. 3 is a block diagram showing the structure of the conventional apparatus.
Figure 4:
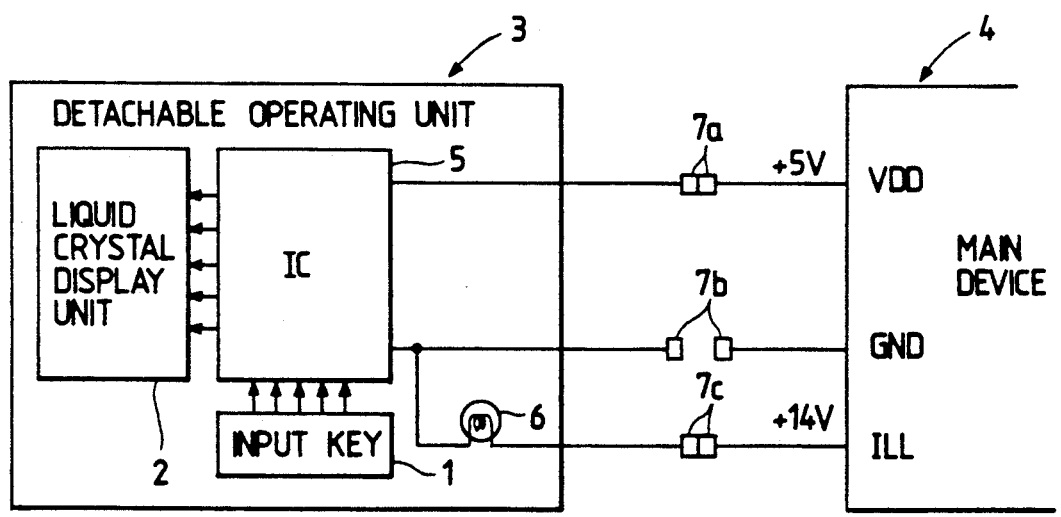
FIG. 4 is a block diagram describing the structure of the conventional apparatus, when the ground terminal is not connected to the main device.

As shown in FIG. 1, the detachable operating unit 3 according to the present invention as shown in FIG. 1 is composed of substantially the same components as those shown in FIGS. 3 and 4. Therefore, the duplicated description will be omitted.

In FIG. 1, assuming that the timing of connection of the ground terminal 7b is delayed from that of the power supply terminals 7a and 7c thereof as shown in FIG. 4, a reverse voltage in response to a difference voltage between operating voltages ILL and VDD, namely, the reverse voltage (for example 5 V − 14 V = −9 V) is applied to an IC circuit 5. However, the reverse voltage is applied to the protective diode 9 with the reverse polarity. The reverse voltage is generated between a power input terminal of the IC circuit and the ground terminal in which the reverse voltage is regarded as a voltage drop (about 0.6 V) caused by applying the voltage through the protective diode 9 with forward polarity. Therefore, the reverse voltage in the same manner as the conventional apparatus is not applied to the IC circuit 5 so as to avoid the breakage of the IC circuit 5.

In this embodiment of the present invention, the protective diode is disposed around the IC circuit 5. The protective diode could be formed on a tip of IC circuit 5 in a manufacturing process.

According to the present invention, the protective diode is connected with the reverse polarity between the ground terminal and the power supply terminal which generates a voltage lower than that of the other power supply terminal thereof so as to absorb a reverse voltage. This avoids breakage of the internal circuit connected to the power supply unit which generates a voltage lower than that of the other power supply thereof. It is therefore unnecessary to employ an engaging/disengaging detecting device, the manufacturing cost is increased, and it is possible to decrease the size of the audio device.

What is claimed is:

1. A detachable operating unit for connection with a main unit comprising:
    at least two power supply units for applying operating voltages to said detachable operating unit, said power supply units generating two different voltages, respectively;
    at least two power supply terminals for engaging said detachable operating unit and said main unit, and for receiving two different voltages which are applied to said power supply units, respectively;
    a ground terminal for engaging the detachable operating unit and said main unit; and
    a protective circuit for applying a predetermined reverse voltage in response to a differential voltage between said two voltages of said power supply units, said protective circuit comprising a single diode having a negative end connected to one of said power supply terminals that receives a lower voltage and a positive end connected to said ground terminal, said diode forming a non-conductive circuit when said ground terminal engages the main unit, said diode forming a conductive circuit when said ground terminal is not engaged with the main unit and said power supply terminals are engaged with the main unit, said diode forming a conductive circuit to limit a reverse voltage across the main unit and protect the main unit from a larger reverse voltage which would otherwise be produced across the main unit by the two operating voltages when the ground is disconnected.

2. A protective circuit as claimed in claim 1, wherein said protective circuit comprises a diode connected between said power supply and ground terminal with reverse polarity.

* * * * *